United States Patent
Spearing (10) Patent No.: US 11,420,571 B1
(45) Date of Patent: Aug. 23, 2022

(54) SERVICEABLE EDGE CLIP ASSEMBLY

(71) Applicant: A. Raymond et Cie, Grenoble (FR)

(72) Inventor: James R. Spearing, Oxford, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 17/184,941

(22) Filed: Feb. 25, 2021

(51) Int. Cl.
*B60R 13/02* (2006.01)
*F16B 2/24* (2006.01)
*F16B 5/06* (2006.01)
*F16B 21/07* (2006.01)
*F16B 37/02* (2006.01)

(52) U.S. Cl.
CPC .......... *B60R 13/0206* (2013.01); *F16B 2/243* (2013.01); *F16B 5/06* (2013.01); *F16B 21/075* (2013.01); *F16B 37/02* (2013.01)

(58) Field of Classification Search
CPC ........ B60R 13/0206; F16B 2/243; F16B 5/06; F16B 21/075; F16B 37/02; F16B 5/065; F16B 2/245; Y10T 24/44692
See application file for complete search history.

(56) References Cited

U.S. PATENT DOCUMENTS

| | | |
|---|---|---|
| 1,030,386 A | 6/1912 | Comeau |
| 2,250,469 A | 7/1941 | Crow |
| 3,137,027 A | 6/1964 | Birkle |
| 3,214,810 A | 11/1965 | Mathison |
| 3,808,651 A | 5/1974 | Almendarez |
| 4,684,305 A | 8/1987 | Dubost |
| 4,883,397 A | 11/1989 | Dubost |
| 5,539,963 A | 7/1996 | Fujiwara et al. |
| D944,632 S * | 3/2022 | Spearing ........................ D8/382 |
| 2005/0105987 A1 | 5/2005 | Giugliano et al. |
| 2006/0066080 A1 | 3/2006 | Ikeda et al. |
| 2008/0229550 A1 | 9/2008 | Elsner |
| 2011/0097137 A1 * | 4/2011 | Spitz ........................ F16B 2/243 403/33 |
| 2011/0154623 A1 | 6/2011 | Schmidt et al. |
| 2012/0124782 A1 | 5/2012 | Elsner et al. |
| 2013/0092803 A1 | 5/2013 | Fujiwara |

(Continued)

FOREIGN PATENT DOCUMENTS

| | | |
|---|---|---|
| DE | 199614 T1 | 10/1987 |
| DE | 69000428 T2 | 5/1993 |

(Continued)

OTHER PUBLICATIONS

Machine assisted translation of DE9210597U1 obtained from https://worldwide.espacenet.com on Feb. 27, 2019, 10 pages.

(Continued)

*Primary Examiner* — Robert Sandy
*Assistant Examiner* — Rowland Do
(74) *Attorney, Agent, or Firm* — Warner Norcross + Judd LLP (57) ABSTRACT

An edge clip assembly for attachment of a component, and, more specifically, an edge clip assembly which is serviceable and self-locking, includes a clip body and a spacer provided within the clip body, and further includes an interlock securing the spacer in a final position in which the clip body can be engaged with the component to hold the component under tension. A ramp disposed on the spacer forms a service tool gap, and a tool can be wedged into the tool gap to disengage the interlock.

20 Claims, 6 Drawing Sheets

(56) References Cited

U.S. PATENT DOCUMENTS

| | | | |
|---|---|---|---|
| 2014/0017025 A1 | 1/2014 | Hemingway et al. | |
| 2015/0211565 A1 | 7/2015 | Benedetti | |
| 2015/0321622 A1 | 11/2015 | Dickinson et al. | |
| 2017/0114809 A1 | 4/2017 | Stickelberger et al. | |
| 2019/0271339 A1* | 9/2019 | Benedetti | F16B 5/126 |
| 2020/0208662 A1* | 7/2020 | Spearing | F16B 2/245 |
| 2020/0366076 A1* | 11/2020 | Naugler | H02G 3/32 |

FOREIGN PATENT DOCUMENTS

| | | |
|---|---|---|
| DE | 9210597 U1 | 12/1993 |
| DE | 202007000938 U1 | 4/2007 |
| DE | 102008038871 A1 | 2/2010 |
| DE | 102008059360 A1 | 6/2010 |
| DE | 102015202409 A1 | 8/2016 |
| EP | 3263916 A1 | 6/2016 |
| WO | 2012017706 A1 | 2/2012 |
| WO | 2012125360 A2 | 9/2012 |
| WO | 2017074860 A1 | 5/2017 |

OTHER PUBLICATIONS

Machine assisted translation of DE102015202409A1 obtained from https://worldwide.espacenet.com on Feb. 27, 2019, 17 pages.
Machine assisted translation of EP3263916A1 obtained from https://worldwide.espacenet.com on Feb. 27, 2019, 11 pages.

* cited by examiner

SERVICEABLE EDGE CLIP ASSEMBLY

FIELD OF THE INVENTION

The present disclosure generally relates to a fastener and, more specifically, to a serviceable edge clip assembly for attachment of a component and/or coupling two components together.

DESCRIPTION OF THE RELATED ART

Clip fasteners, or edge clips replace traditional screw fixings in many applications, and have a variety of uses in a wide range of industries. Generally speaking, edge clips are utilized for fastening two or more components together. One challenge faced by industries reliant on edge clips relates to fastening locations thereof, which may offer only limited access for assembly during manufacture and removal and/or adjustment during maintenance and service. Some clips are not serviceable and are difficult to remove, often requiring a specialized removal tool or permanent damage to the clip or component. Another challenge includes damage to the fastened components, as traditional edge clips can scratch or gauge the components, which can be particularly problematic when the surface of the component is painted or has another surface coating. For example, a scratched surface undesirably impacts aesthetics and, for metal surfaces, potential passivation properties and corrosion resistance. Each of these challenges has the potential to increase assembly cost because of extra assembly time, as well as potentially requiring repair time for the components.

Edge clips commonly find particular utility in the automotive sector. In the automotive sector, edge clips have many uses, including in air bag assembly, window construction, instrument panels and interior and exterior trim attachment. Some automotive components must meet installation and removal standards for service.

Modern demands on the design and construction of edge clips mean that new clip fastener solutions need to contribute to ease of assembly as used in production, particularly in view of increasing automation, ease of removal for servicing, and provide excellent attachment strength, while maintaining high reliability and low production costs. Compliance with the requirements of the various industries, including the automotive industry, has proved challenging to current edge clip designs.

BRIEF SUMMARY OF THE INVENTION

A self-locking edge clip assembly is provided herein. In an exemplary embodiment, the edge clip assembly includes a clip body changeable between an open configuration in which a component may be freely inserted and an engaged configuration in which the component is captured thereby. The edge clip assembly also includes a spacer slideably and linearly moveable in the clip interior between an initial position in which the clip body is in the open configuration and a final position in which the clip body is in the engaged configuration, the spacer extending partially outside the clip body when in the initial position, and an interlock securing the spacer in the final position. A ramp is disposed on the spacer and confronts a portion of the clip body in the final position, the ramp and the clip body defining a tool gap therebetween, whereby a tool can be wedged into the tool gap to pry the clip body outwardly and disengage the interlock.

In some embodiments, the clip body can include a first clip leg, a second clip leg, and a clip end connecting the first and second clip legs. The ramp is provided on the first clip leg.

In these and other embodiments, at least the first clip leg has a slot defined thereby, and the spacer comprises a rib extending along a surface thereof, with the interlock formed by an engagement of the rib with the slot.

In another alternative exemplary embodiment, the edge clip assembly includes a u-shaped clip body comprising a first clip leg, a second clip leg, a clip end wall connecting the first and second clip legs, and a slot in the first clip leg. The edge clip assembly further includes a u-shaped spacer slideably moveable in the clip body between an initial position and a final position, the spacer comprising a first spacer leg, a second spacer leg, a spacer end wall connecting the first and second spacer legs, and a rib extending from the first spacer leg. The first and second spacer legs extend partially outside the clip body when in the initial position and being disposed entirely within the clip body when in the final position. An interlock is formed between the rib and the slot, the interlock securing the spacer in the final position. A ramp is disposed on the first spacer leg, and confronts the first clip leg in the final position, the ramp and the first clip leg defining a tool gap therebetween, whereby a tool can be wedged into the tool gap to pry the first clip leg outwardly and disengage the rib from the slot.

These and other features and advantages of the present disclosure will become apparent from the following description of particular embodiments, when viewed in accordance with the accompanying drawings and appended claims.

DETAILED DESCRIPTION OF THE INVENTION

A serviceable, self-locking edge clip assembly is described below. As will be appreciated from the description herein, the self-locking (or self-closing or self-latching or self-retaining) edge clip assembly, also referred to herein as the "edge clip assembly," has myriad end use applications but is generally used to hold a component under tension to the edge clip assembly, thus providing broad application across multiple industries. As but one example, the edge clip assembly may be used to secure one component of a vehicle (e.g. a panel) to another component of the vehicle during assembly. However, end use applications of the edge clip assembly are not so limited, including with respect to the automotive industry. At least some embodiments of the edge clip assembly provided herein functions through the various elements thereof, as described below, to provide improved serviceability via a serviceable configuration that allows the edge clip assembly to be removed from a component without damaging the assembly or component. After servicing, the edge clip can be reinstalled on the component. At least some embodiments of the edge clip assembly provided herein functions through the various elements thereof, as described below, to provide clearance from a biting feature of the edge clip assembly until the component is fully seated and thereby avoids scratching or gauging the component. By avoiding the scratching or gauging of a painted surface, the risk of corrosion is also minimized or entirely eliminated. At least some embodiments of the edge clip assembly provided herein functions through the various elements thereof, as described below, to function as a traditional edge clip fastener in the absence of a clearance component. At least some embodiments of the edge clip assembly provided herein functions through the various elements thereof, as described below, to prevent interlocking of the biting feature during shipping and/or transit, thereby arriving at its end destination ready to use. At least some embodiments of the edge clip assembly provided herein function through the various elements thereof, as described below, to support a cable tie in multiple orientations, thereby offering flexible application across multiple industries. As such, certain features of the spacer may be considered functional, but may also be implemented in different aesthetic configurations.

Figure 1:
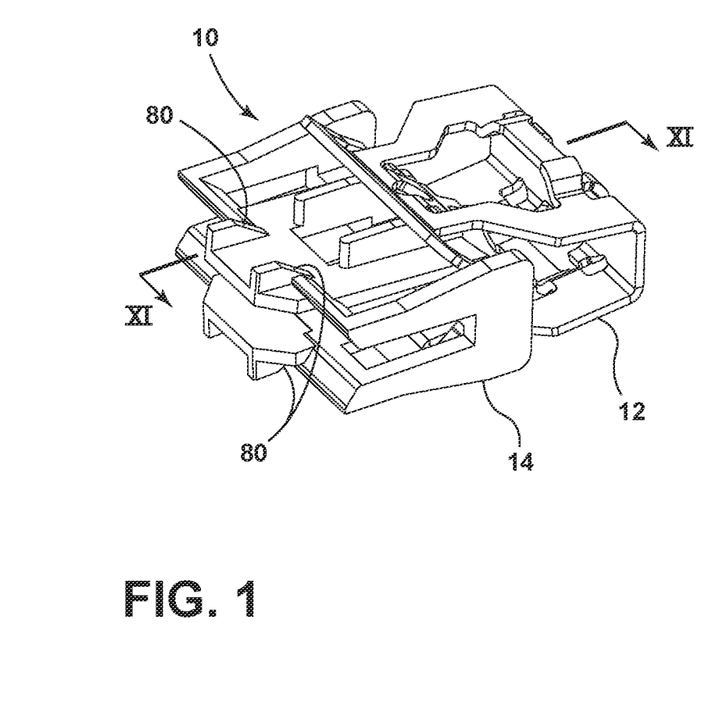
FIG. 1 is a perspective view of a self-locking edge clip assembly in accordance with one embodiment, shown in an initial position.
Figure 2:
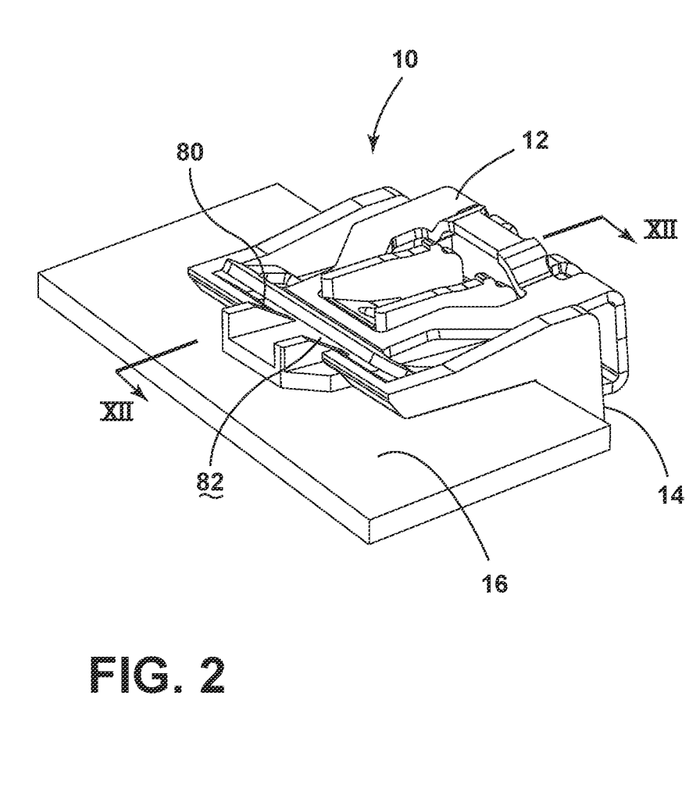
FIG. 2 is a perspective view of the edge clip assembly shown in a final position in which a component is captured thereby.
Figure 3:
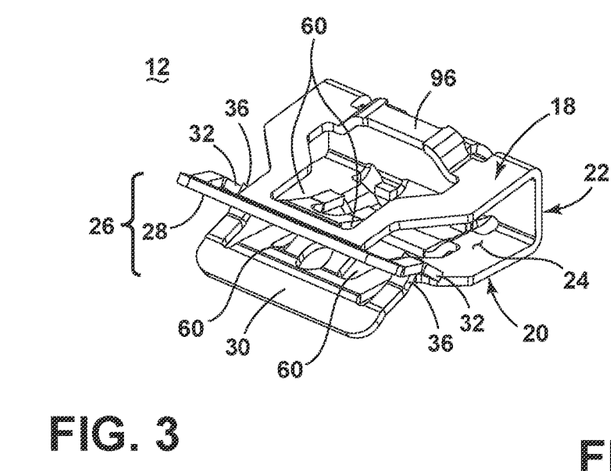
FIG. 3 is a perspective view of a clip body of the edge clip assembly in accordance with the embodiment shown in FIG. 1.
Figure 4:
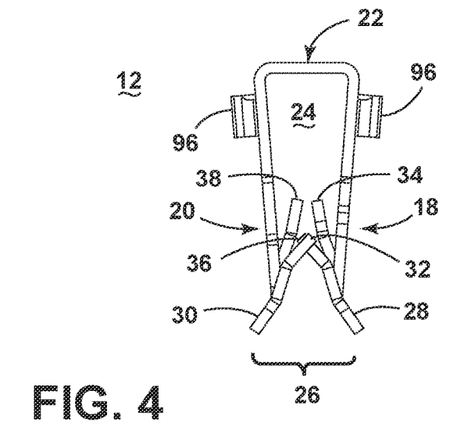
FIG. 4 is a side view of the clip body.
Figure 5:
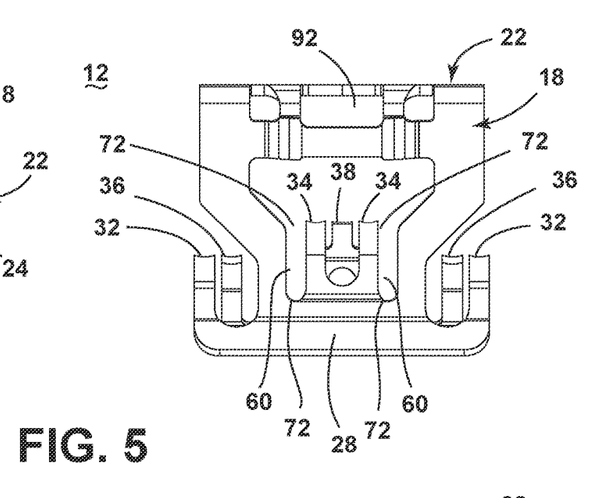
FIG. 5 is a top view of the clip body.

In an exemplary embodiment shown in FIGS. 1-2, wherein like numerals indicate corresponding parts throughout the several views, the edge clip assembly is illustrated and generally designated at 10. The edge clip assembly 10 includes a clip body 12 and a spacer 14 provided within the clip body 12. The clip body 12 can be changeable between an open configuration, one example of which is shown in FIG. 1, wherein a component may be freely inserted, and an engaged configuration, wherein a component 16 is captured by the clip body 12, one example of which is shown in FIG. 2. The spacer 14 is slideably moveable relative to the clip body 12 between an initial position, one example of which is shown in FIG. 1, in which the clip body 12 is in the open configuration and a final position, one example of which is shown in FIG. 2, in which the clip body 12 is in the engaged configuration. As described in further detail below, the spacer 14 provides clearance between the component 16 and a biting feature of the clip body 12 until the component 16 is fully seated, i.e. until the clip body 12 is in the engaged configuration, and thereby avoids scratching or gauging the component 16.

An interlock can be provided for securing the spacer 14 in the final position, in which the clip body 12 is in the engaged configuration and applies locking tension to the component 16. The interlock can further coordinate the movement of the spacer 14 relative to the clip body 12, and may aid in constraining the spacer 14 for linear movement within the clip interior 24.

As described in further detail below, the edge clip assembly 10 has a serviceable configuration for removing the edge clip assembly 10 from a component without damaging the assembly or the component, and without the use of a specialized tool. The serviceable feature of the edge clip assembly 10 is a ramp 80 disposed on the spacer 14. The ramp 80 and clip body 12 are relatively positioned to each to define, in the engaged configuration shown in FIG. 2 a tool gap 82 for insertion of a tool therein to disengage the interlock. A removal tool, such as a screwdriver or another non-specialized tool having an end fittable into the tool gap 82, may be used to pry or bend a portion of the clip body 12 away from the spacer 14 to facilitate disengagement of the interlock.

The clip body 12, spacer 14, and ramp 80 can comprise any material capable of generating a clamp load to hold the component 16 with enough tension so as to prevent the component 16 from separating from the edge clip 10. The spacer 14 and ramp 80 can further be composed a material which will not scratch, gauge, or otherwise damage the surface of the component 16.

The clip body 12 can comprise a metal or a metal alloy, such as steel, stainless steel, aluminum, or carbon steel.

In some embodiments, the spacer 14 and ramp 80 can comprise a polymeric material, such as a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The spacer 14 can be made via various techniques, which is typically a function of its material. For example, the spacer 14 can be made via molding, extrusion, etc. Alternatively, the spacer 14 can be made via an additive manufacturing process, e.g. a 3-D printing process. The ramp 80 can be integrally formed with the spacer 14, or formed separately and attached using a suitable joining technique.

However, myriad materials may be used to manufacture the clip body 12, spacer 14, and ramp 80, with each typically being selected as a function of availability, cost, performance/end use applications, etc. Moreover, metals, metal alloys, resins are not exhaustive of suitable materials that may be used.

Referring to FIGS. 3-6, the clip body 12 includes a first clip leg 18 and a second clip leg 20. The first and second clip legs 18, 20 can be connected by a clip end 22, which is at least partially closed so as to connect the first and second clip legs 18, 20. The clip end 22 can be formed as one or more end walls connecting the legs 18, 20, and can be curved or straight. In certain embodiments, the clip body 12 is generally U-shaped.

The clip legs 18, 20 and end 22 together define a clip interior 24 having an open end 26. The open end 26 can generally be defined between free ends 28, 30 of the clip legs 18, 20 opposite the clip end 22. One or both of the ends 28, 30 of the clip legs 18, 20 can be out-turned, e.g. by bending or otherwise forming the end to angle outwardly. Having out-turned ends 28, 30 defining the open end 26 of the clip body 12 allows for easy insertion of the component 16 into the clip interior 24. As will be described in further detail below, the out-turned ends 28, 30 define, in part, the tool gap 82 (FIG. 2).

To assure that the component 16 is securely held to the clip body 12, at least one biting feature can be provided on the clip body 12. One embodiment of a biting feature is a component-gripping barb 32, 34, 36, 38 provided on at least one of the clip legs 18, 20. Optionally, at least one barb is provided on each leg 18, 20, and/or multiple barbs are provided per leg 18, 20. In the illustrated embodiment, two lateral barbs 32 are formed on the clip first leg 18 and two medial barbs 34 are formed in between the lateral barbs 32. Similarly, two lateral barbs 36 are formed on the second clip leg 20 and a medial barb 38 is formed in between the lateral barbs 36. The barbs 32, 34, 36, 38 assure that only unidirectional movement of the component 16 into the clip body 12 is possible, and resist movement of the component 16 out of the clip body 12. The barbs 32, 34, 36, 38 can have a variety of shapes, including but not limited to flat, sharp, round, or spiked. In other embodiments, the clip body 12 can be configured to apply locking tension to the component 16 without at least one biting feature.

The various barbs 32, 34, 36, 38 can be staggered laterally. In the embodiment shown, the lateral barbs 32 of the first clip leg 18 are disposed laterally, e.g. outside, the lateral barbs 36 of the second clip leg 20. To stagger the lateral barbs 32, 36, the end 28 of the first clip leg 18 can be wider than the end 30 of the second clip leg 20. The medial barbs 34 of the first clip leg 18 are disposed laterally, e.g. to either side of, the medial barb 38 of the second clip leg 20. In other embodiments, the barbs 32, 34, 36, 38 can have different relative positions or can be provided on the clip body 12 in different orientations.

Figure 7:
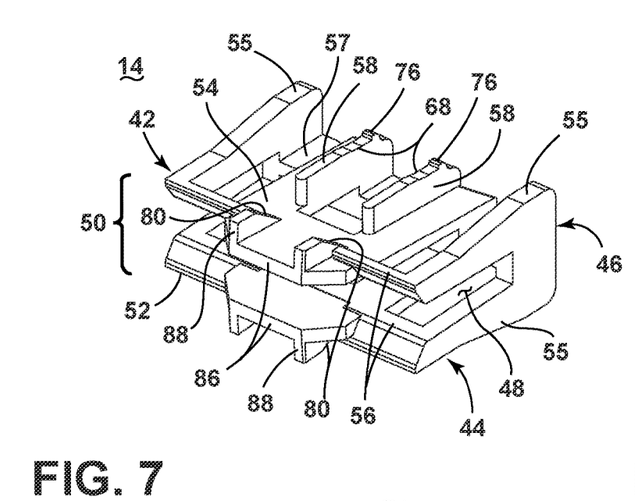
FIG. 7 is a perspective view of a spacer of the edge clip assembly in accordance with the embodiment shown in FIG. 1.
Figure 8:
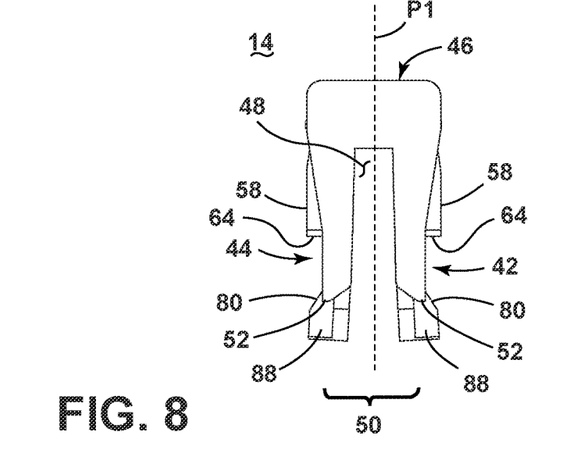
FIG. 8 is a side view of the spacer.
Figure 9:
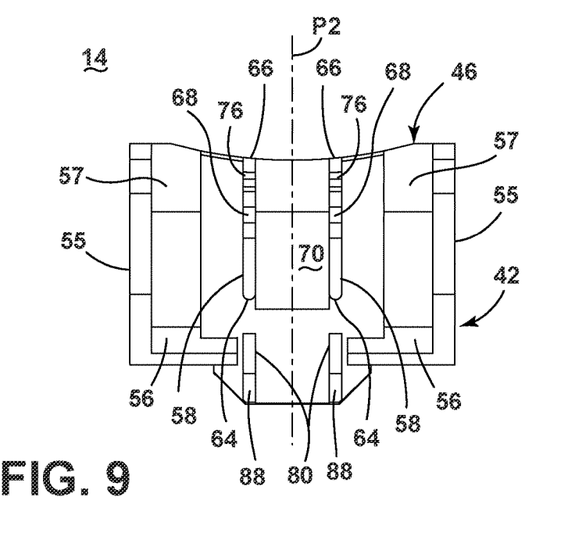
FIG. 9 is a top view of the spacer.
Figure 10:
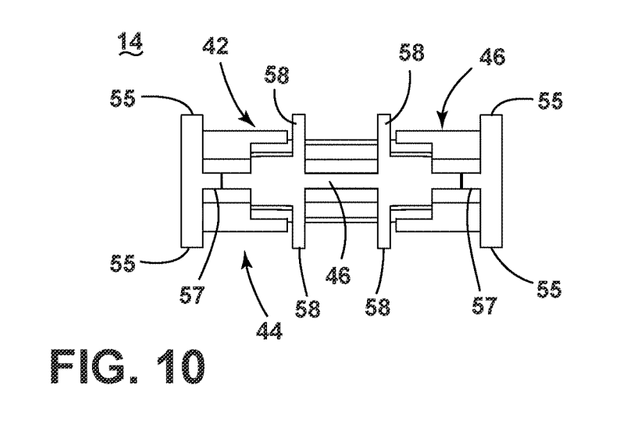
FIG. 10 is a rear view of the spacer.

Referring to FIGS. 7-9, the spacer 14 can include a first spacer leg 42 and a second spacer leg 44. The first and second spacer legs 42, 44 can be connected by a spacer end 46, which is at least partially closed so as to connect the first and second spacer legs 42, 44. The spacer end 46 can be formed as one or more end walls connecting the legs 42, 44, and can be curved or straight. Optionally, the spacer 14 is generally U-shaped.

The spacer legs 42, 44 and end 46 can together define a spacer interior 48 having an open end 50. The open end 50 can generally be defined between ends 52 of the spacer legs 42, 44 opposite the spacer end 46. The open end 50 and ends 52 can be generally orthogonal to the direction of sliding and/or movement of the spacer 14, as shown herein. Alternatively, the open end 50 and ends 52 can be non-orthogonal to the direction of sliding and/or movement of the spacer 14.

The spacer legs 42, 44 can include center portions 54 and side rail portions 55 attached to the center portions 54 by web portions 56, 57. The clip legs 18, 20 can slide over the center portions 54 and between the rail portions 55, with the side rail portions 55 overlapping the lateral sides of the clip legs 18, 20 to limit the lateral displacement of the clip legs 18, 20 relative to the center portions 54 of the spacer legs 42, 44.

The ends 52 of the spacer legs 42, 44 can extend laterally between the ramps 80 and forward ends of the rail portions 55. It is noted that rear ends of the rail portions 55 and second web portions 57 may form a portion of the spacer end 46.

As introduced above, the spacer 14 is slideably moveable in the interior 24 of the clip body 12, between an initial position, which can be an as-shipped position, in which the clip body 12 is in the open configuration, an example of which is shown in FIG. 1, and a final position in which the clip body 12 is in the engaged configuration, an example of which is shown in FIG. 2. When in the initial position, the spacer 14 can extend partially outside the clip body 12. For example, a portion of the spacer 14 can be disposed between the clip legs 18, 20 and a portion of the spacer 14 can extend outwardly from the open end 26 of the clip body 12. When in the final position, a substantial portion of the spacer 14 can be disposed within the clip body 12. For example, a substantial portion of the spacer 14 can be disposed between the clip legs 18, 20, with only a small portion of the spacer 14 extending outwardly from the open end 26 of the clip body 12. The portion of the spacer 14 that remains outside the clip legs 18, 20 in the final position can include the ramps 80. In the illustrated embodiment, the first and second spacer legs 42, 44 can extend partially outside the clip body 12 when in the initial position and can be disposed substantially entirely within the clip body 12 when in the final position. More specifically, the ends 52 of the spacer legs 42, 44 can protrude beyond the free ends 28, 30 of the clip legs 18, 20 in the initial position. The spacer end 46, and portions of the spacer legs 42, 44, can be disposed within the clip body 12 in both the initial and final positions, with the spacer 14 moving linearly within the clip body 12 to translate the spacer end 46 closer to the clip end 22 in the final position. The rail portions 55 travel along the outside of the clip body 12.

As briefly described above, the edge clip assembly 10 can include an interlock that secures the spacer 14 in the final position, an example of which is shown in FIG. 2, in which the clip body 12 is in the engaged configuration and applies locking tension to the component 16. In one embodiment, the interlock can comprise at least one rib 58 extending from the spacer 14 and at least one slot 60 defined by the clip body 12. The interlock can be formed between the rib 58 within the slot 60, i.e. by the engagement or registry of the rib 58 with the slot 60.

The at least one rib 58 can extend along a surface of the spacer 14, such as along an outer surface of the center portion 54 of one or both of the spacer legs 42, 44. Optionally, at least one rib 58 is provided on each leg 42, 44, and/or multiple ribs 58 are provided per leg 42, 44. In the illustrated embodiment, two ribs 58 are formed on the first spacer leg 42 and two ribs 58 are formed on the second spacer leg 44. The ribs 58 on each leg 42, 44 can be parallel to each other. The ribs 58 on each leg 42, 44 can have the same or different lengths.

Referring to FIGS. 8-9, the ribs 58 can include a first end 64 and a second end 66, with the first end 64 nearer or at the open end 50 of the spacer 14 and the second end 66 nearer or at the spacer end 46. The ribs 58 can include a notch 68 in between the first and second ends 64, 66 in which the legs 18, 20 of the clip body 12 rest in the pre-assembled/initial position.

The spacer 14 can comprise a window 70 disposed between the ramps 80 and the spacer end 46. Optionally, the ribs 58 can be provided at either side of the window 70. The window 70, which can be formed as opening through each spacer leg 42, 44, can be sufficiently large so that the medial barbs 34, 38 may pass therethrough upon sliding movement of the spacer 14 to the final position in which the clip body 12 is in the engaged configuration.

The at least one slot 60 can be defined in one of the clip legs 18, 20, and can comprise a narrow, elongated depression, groove, notch, slit, or aperture for receiving or admitting the at least one rib 58. In certain embodiments, the at least one slot 60 can be disposed orthogonal to the open end 26, i.e. the lengthwise extension of the slot 60 can be orthogonal, including generally orthogonal, to the open end 26, to assure that the spacer 14 slides orthogonally relative to the open end 26. In other embodiments, the at least one slot 60 can be disposed non-orthogonally to the open end 26. Optionally, at least one slot 60 is defined by each clip leg 18, 20, and/or multiple slots 60 are defined per leg 18, 20. In the illustrated embodiment, two slots 60 are defined by the first clip leg 18 and two slots 60 are defined by the second clip leg 20. The slots 60 can be elongated and the engagement of the ribs 58 with the elongated slots can constrain the spacer 14 to linear movement within the clip body 12 in the direction of elongation.

Figure 6:
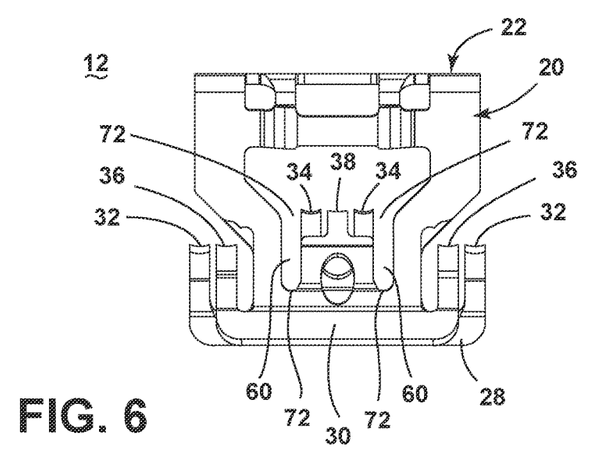
FIG. 6 is a bottom view of the clip body.

Referring to FIG. 6, the slots 60 can include a first or closed end 72 and a second or open end 74, with the closed end 72 nearer the open end 26 of the clip body 12 and the open end 74 nearer the clip end 22. The closed end 72 can be formed by an edge of the slot 60. Optionally, the slots 60 on each leg 18, 20 can be provided at either side of the medial barbs 34, 38 and between the lateral barbs 32, 36.

With multiple ribs 58 and slots 60 provided, multiple interlocks can be formed between the ribs 58 and slots 60. The engagement or registry of the ribs 58 with the slots 60 assure that only linear movement of the spacer 14 within the clip body 12 is possible, and secures the spacer 14 in the final position, in which the clip body 12 is in the engaged configuration. The further provision of latches associated with the interlock resists movement of the spacer 14 out of the clip body 12, and reduces the possibility of the spacer 14 being displaced from the clip body 12 prior to use, such as during shipping or transit.

It is also noted that the number and location of ribs 58 and slots 60 can vary from the illustrated embodiment, and it will be understood by those skilled in the art that the edge clip assembly 10 can use different numbers of ribs 58 and slots 60 and in different locations in accordance with the principles of the present disclosure. For example, while the embodiment shown herein includes ribs 58 on each spacer leg 42, 44 and slots 60 on each clip leg 18, 20, in other embodiments, ribs 58 can be provided on only one of the spacer legs 42, 44, with slots 60 correspondingly provided on only one of the clip legs 18, 20. Such a one-sided interlock may be sufficient to secure the spacer 14 in the final position.

The edge clip assembly 10 can include at least one latch to limit the slideable withdrawal of the spacer 14 from the clip body 12. For example, the latch can prevent the spacer 14 from withdrawing past the initial position. The at least one latch can be associated with the interlock between the spacer 14 and the clip body 12, and can more specifically be associated with the at least one rib 58 of the spacer 14.

Optionally, the latch can comprise at least one locking element 76 on one of the spacer 14 or the clip body 12 that engages with an element on the other of the spacer 14 or the clip body 12 to limit the slideable withdrawal of the spacer 14 from the clip body 12. In the illustration embodiment, at least one locking element 76 is provided on each rib 58, such as between the notch 68 and the second end 66 of the rib 58. The locking element 76 can have a variety of shapes, including but not limited to flat, round, or barbed. The locking element 76 can project into and slide within the slot 60. The locking element 76 can engage the closed end or edge 72 of the slot 60 to limit the slideable withdrawal of the spacer 14 from the clip body 12 to no further than the initial position. The notch 68 can be spaced from the locking element 76 in a direction of slideable and linear movement of the spacer 14. The provision of the open ends 74 on the slots 60 can allow the spacer 14 to freely slide further into the clip body 12 until the medial barbs 34, 38 reach the window 70 and engage the component 16. While shown as being spaced inwardly from the lateral sides of the spacer 14, the locking elements 76 can be provided at the lateral sides of the spacer end 46, or at various other locations on the spacer 14.

As briefly described above, the edge clip assembly 10 can has a serviceable configuration for removal of the clip assembly 10 without a specialized removal tool or permanent damage to the clip assembly 10. In one embodiment, the spacer 14 can comprise at least one ramp 80 that defines, in the engaged configuration (FIG. 2), a tool gap 82 for insertion of a tool therein to disengage the interlock. More particularly, a generic release tool, such as a screwdriver or other tool, can be wedged into the tool gap 82 to pry the clip leg 18, 20 away from the spacer leg 42, 44, thereby freeing at least the first end 64 of the rib 58, also referred to herein as the locking end 64, from engagement with the end 72 of the slot 60. This release and/or disassembly may be utilized to remove, recycle, repurpose, re-install, or otherwise service the edge clip assembly 10 after installation. It is noted that the tool release may need to be performed for both clip legs 18, 20 or just one of the clip leg 18, 20 or, depending on the configuration of the interlock.

With the serviceable configuration disclosed herein, a tool is necessary to disengage the interlock between the clip body 12 and spacer 14 once the interlock has been engaged, so that inadvertent disengagement of the clip body 12 from the spacer 14 does not occur. Thus, the serviceable configuration disclosed herein is superior to clip fasteners that rely on a serviceable arrangement involving screws or bolts, as such screws or bolts are liable to loosen over time. However, the tool need not be specialized, and can be any tool providing sufficient leverage force to pry the clip leg 18, 20 away from the spacer leg 42, 44.

The ramp 80 is generally disposed at the open end 50 of the spacer 14. Various supporting structures for the ramp 80 are possible. As shown, the spacer 14 can include a projecting portion 86 on which the ramp 80 is disposed. The projecting portion 86 can extend from the center portion 54 of the spacer leg 42, 44. In various embodiments, the ramp 80 can be partially disposed on the projecting portion 86 and partially disposed on the center portion 54, fully disposed on the projecting portion 86, fully disposed on the center portion 54, or disposed elsewhere on the spacer leg 42, 44 in a position to confront one of the clip legs 18, 20 in the final position and form tool gap 82 therebetween.

The ramp 80 can be wedge-shaped or otherwise shape with a slope. The ramp 80 can slope downwardly in a direction extending from the open end 50 to the spacer end 46.

The ramp 80 can extend from an outwardly-facing surface of the spacer 14 toward an inwardly-facing surface of the clip leg 18. 20. The bottom of the ramp 80 can meet the outer surface of the center portion 54 or another portion of the spacer leg 42, 44. The top of the ramp 80 can extend outwardly to a stiffening portion 88 that connects the ramp 80 to a portion of the spacer leg 42, 44, such as to the projecting portion 86, and reduces flexing of the ramp 80.

The embodiment shown herein includes ramps 80 on each spacer leg 42, 44. The ramps 80 can be axially aligned with the ribs 58, as best seen in FIG. 9. It is noted that the number and location of the ramps 80 of the spacer 14 can vary from the illustrated embodiment, and it will be understood by those skilled in the art that the spacer 14 can use different numbers of ramps and in different locations in accordance with the principles of the present disclosure. For example, while the embodiment shown herein includes two ramps 80 on each spacer leg 42, 44, in other embodiments, one ramp 80 can be provided on the spacer legs 42, 44, or more than two ramps 80 can be provided on each spacer leg 42, 44. In yet another embodiment, one or more ramps 80 can be provided on one of the spacer legs 42, 44, rather than on both of the legs 42, 44.

In this embodiment, the projecting portions 86 are elongated laterally along the ends 52 of the spacer legs 42, 44, to support multiple laterally-spaced ramps 80. The elongated projecting portions 86 can also assist in guiding the component 16 (FIG. 1) between the legs 42, 44 of the spacer 14 and the legs 18, 20 of the clip body 12. In some embodiments, the projecting portions 86 may lie against the outer surface of the component 16 engaged by the assembly 10, increasing contact area and assisting in gripping the component 16.

In some embodiments, the spacer 14 can have bilateral symmetry. For example, in the embodiment shown, the sides of the spacer 14 generally corresponding to the spacer legs 42, 44 can be divided into approximate mirror images of each other along a midline separating the legs 42, 44. With reference to FIG. 8, the spacer 14 can be bilaterally symmetrical across a plane bisecting the spacer 14, i.e. a plane P1 extending through the spacer end 46 to divide the spacer 14 equally. The illustrated spacer 14 is further bilaterally symmetrical when viewed from the top, as shown in FIG. 9. With reference to FIG. 9, the spacer 14 can be bilaterally symmetrical across a plane P2 bisecting the spacer 14, i.e. a plane extending between the ribs 58 and ramps 80 to divide the spacer 14 equally. With the spacer 14 being bilaterally symmetrical, the edge clip assembly 10 can be easy to assemble and use since the spacer 14 does not have a predetermined top and bottom or left and right side, and can be inserted into the clip body 12 with either spacer leg 42, 44 is matched to either clip leg 18, 20.

Each rib 58 can be elongated along the same direction as the ramp 80 aligned with the rib 58, with the rib 58 and ramp 80 being aligned along a common axis or plane. Such an axis or plane can be parallel the plane P2. The ramps 80 can slope downwardly to meet an outer surface of the spacer 14, with this lower end of the ramp 80 being spaced from the first end 64 of the rib 58.

Figure 11:
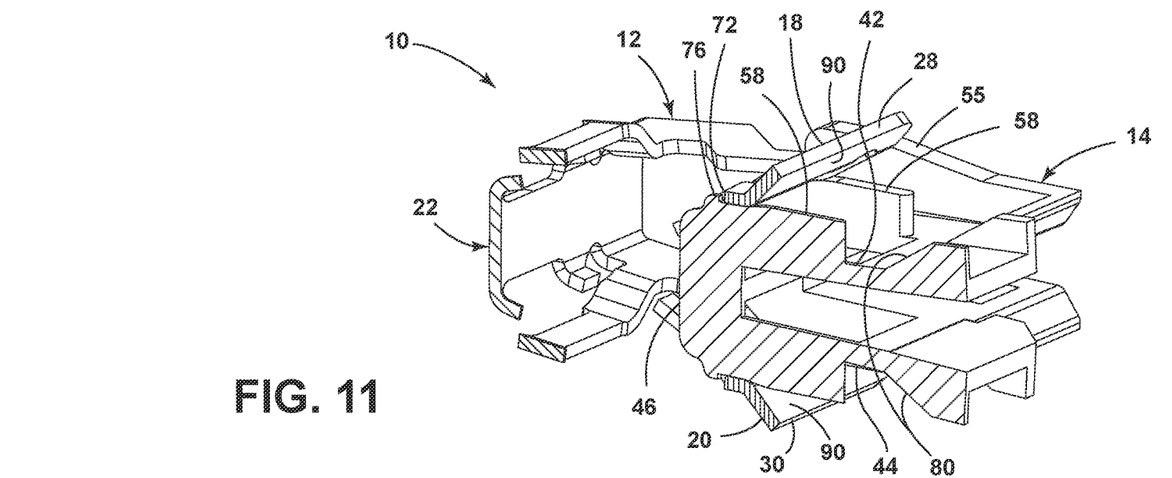
FIG. 11 is a sectional view showing the edge clip assembly in the initial position in which the clip body is open and ready to receive a component, taken at line XI-XI of FIG. 1.
Figure 12:
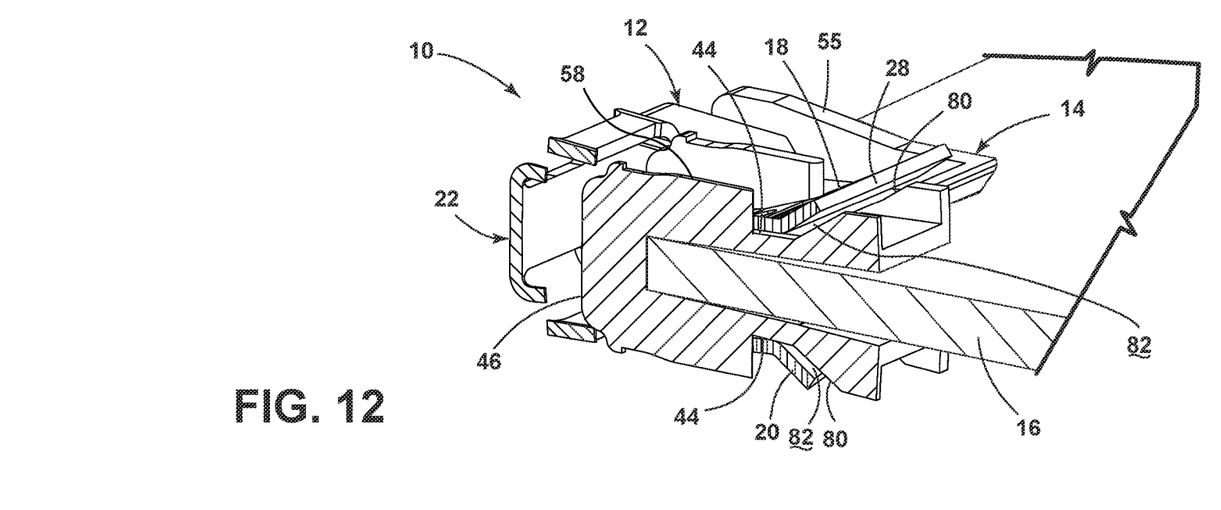
FIG. 12 is a sectional view showing the edge clip assembly in the final position in which the component is captured thereby, taken at line XII-XII of FIG. 2.

FIG. 11 is a sectional view taken along line XI-XI of FIG. 1, and shows the edge clip assembly 10 in the initial position in which the clip body 12 is open and ready to receive a component. This position can represent an as-shipped position of the edge clip assembly 10. FIG. 12 is a sectional view taken long line XII-XII of FIG. 2, and shows the edge clip assembly 10 in the final position in which the component 16 is captured thereby. The ramps 80 are spaced from the clip ends 28, 30 in the initial position, which assists in clipping the assembly 10 over a section of the component 16, as the projecting portions 86 and spacer ends 52 can flex outwardly as the assembly 10 is pushed over the component 16 without constraint from the clip end. 28, 30.

The tool gap 82 is generally formed by the sloping surface of the ramp 80 and an inward side 90 of the angled clip leg end 28, 30. The ramp 80 and inward side 90 confront each other in the final position (FIG. 12), with a space therebetween that is sized for insertion of a tool. The inclined ramp 80 provides enough space to allow a tool to be wedged into the tool gap 82, under the inward side 90 of the clip end 28, 30, in order for the clip leg 18, 20 to be levered upwardly, high enough for the slots 60 to clear the ribs 58. This spacing also assists in removal of the edge clip assembly 10, since a screwdriver or other removal tool may be used to pry up the clip ends 28, 30 more easily than with an embodiment wherein the ramps 80 lie flush against the clip ends 28, 30 without the tool gap 82.

As noted above, the ends 28, 30 of the clip legs 18, 20 can be out-turned, e.g. by bending or otherwise forming the end to angle outwardly. Such a bend further affords a larger tool gap 82 between the inward sides 90 of the clip end 28, 30 and the ramps 80 for the insertion of a tool when it is desired to unlatch the clip body 12 from the spacer 14.

The edge clip assembly 10 can be provided to an end user in a pre-attachment state as illustrated in FIG. 11. In this state, the movable spacer 14 is in the initial positon and is positioned toward the open end of the clip body 12. The locking elements 76 on the spacer 14 engage the slot ends 72 in the clip body 12. This engagement prevents the spacer 14 from detaching from the clip body 12.

The initial position of the spacer 14 maintains a widely-spaced relationship between the free ends 28, 30 of the clip legs 18, 20, thereby allowing insertion of the component 16 therebetween. The wedging action of the spacer 14 can be provided by the ribs 58, with the distance between opposing outer surfaces of the ribs 58 being greater than the distance between the legs 18, 20. The ribs 58 can exert a force pushing the first clip leg 18 and the second clip leg 20 apart when the spacer 14 is in the initial position. The projecting portions 86 can assist in guiding the component 16 between the legs 42, 44 of the spacer 14. The widely spaced relationship between the clip legs 18, 20 also spaces the barbs 32, 34, 36, 38 (FIGS. 3-6) on the legs 18, 20 apart, which can prevent interlocking of these biting features during shipping and/or transit, ensuring that the edge clip assembly 10 is ready to use at its end destination.

Insertion of the component 16 slides the spacer 14 to the final position as shown in FIG. 12, in which the clip body 12 is in the engaged with the component 16 to hold the component 16 under tension. In some embodiments, the component 16 may be inserted into the spacer 14 without substantial movement of the spacer 14 relative to the clip body 12 until the inserted end of the component 16 reaches the spacer end 46. Further insertion of the component 16 initiates sliding movement of the spacer 14 within the clip body 12 until spacer 14 reaches the final position. In other embodiments, the spacer 14 may move relative to the clip body 12 as the component 16 is inserted into the spacer 14, e.g. before the inserted end of the component 16 reaches the spacer end 46.

As illustrated in FIG. 12, in the final position or attachment state, the clip legs 18, 20 are closed together and the barbs 32, 34, 36, 38 grip opposing surfaces of the component 16. The ramps 80 on the spacer 14 have slid toward and now confront the inward side 90 of each clip leg end 28, 30, thereby forming the tool gaps 82. In the final position, the ribs 58 are received by the slots 60 and do not exert force on the clip legs to push them apart. The ramps 80 also do not exert force on the clip legs 18, 20 to push them apart, ensuring that the clip legs 18, 20 are closed together.

Figure 13:
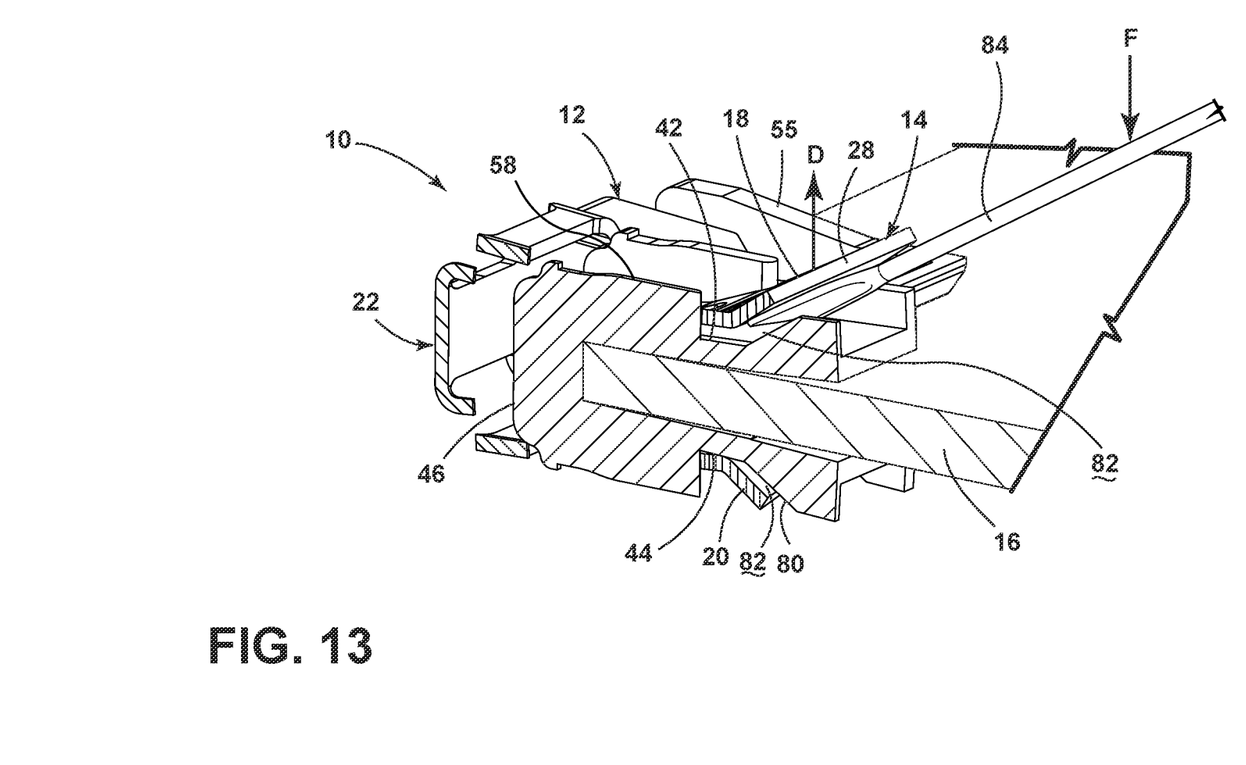
FIG. 13 is a view similar to FIG. 12, showing insertion of a tool into a tool gap of the edge clip assembly to disengage an interlock.

Referring to FIG. 13, in the event the component 16 or an area adjacent the component requires servicing, the clip body 12, and thereby the component 16, may be withdrawn back to the open configuration by disengaging the interlock. By inserting a generic release tool 84 into the tool gap 82 and applying sufficient force F to pry the clip leg 18, 20 away from the spacer leg 42, 44, the slots 60 are removed from the ribs 58, and the clip body 12 can be slid back to the initial position shown in FIG. 11, permitting removal from the component 16 if desired. It is noted that the tool release may need to be performed for both clip legs 18, 20 or just one of the clip leg 18, 20 or, depending on the configuration of the interlock. FIG. 13 shows the tool 84 prying the first clip leg 18 in a direction D away from the first spacer leg 42.

When it is desired to disengage the interlock, the screwdriver or other generic release tool 84 is slid into the tool gap 82, e.g. inwardly and downwardly relative to the ramp 80, until the tool 84 fits under the leg end 28 of clip leg 18. By a leverage action, the clip end 28 is raised from the position of FIG. 12 to the position of FIG. 13, where the ribs 58 are free of the slots 60. Also by this action, the medial barbs 34, 38 on the clip body 12 clear the windows 70 on the spacer 14. Thereupon, the clip leg 18 can be moved back to where the slot end 72 is over the top of the rib 58, with the ribs 58 holding the clip leg 18 away from the spacer leg 42. The process can be repeated on the other side. The clip body 12 can then be moved to the initial or pre-assembled position of FIG. 11, without damage to the clip body 12, spacer 14, or component 16.

An exemplary method of using of the edge clip assembly 10 includes inserting the component 16 within the clip edge clip assembly 10, and more particularly within the interior 48 of the spacer 14, between the spacer legs 42, 44, and pushing the component 16 into the clip body 12 until the component 16 is captured by the clip body 12. Pushing the component 16 into the clip body 12 includes displacement of the spacer 14 between the initial position and the final position, in which the clip body 12 is in the engaged configuration and the component 16 is captured by the clip body 12. During insertion, the spacer 14 prevents scratching of the component 16 by the clip body 12 before the clip body 12 is in the engaged configuration. In the engaged configuration, the clip body 12 can be configured to apply locking tension to the component 16. Optionally, in the engaged configuration, the barbs 32, 34, 36, 38 can bite into the component 16 to securely hold the component 16. In certain embodiments, the component 16 comprises a material susceptible to corrosion, while the clip body 12 comprises a metal or metal alloy. In such embodiments, the spacer 14 can comprise a polymeric material to avoid the scratching or gauging of a painted surface by the barbs 32, 34, 36, 38, which can minimize or entirely eliminate the risk of corrosion on the component 16.

In least some embodiments, the edge clip assembly 10 is also useable to securely hold a component in the absence of the spacer 14. In such an instance, the clip body 12 functions like a traditional edge clip fastener. An exemplary method of using of the edge clip assembly 10 in such an instance includes inserting a component directly into with the interior 24 of the clip body 12, between the clip legs 18, 20, and pushing the component into the clip body 12 until the component is captured by the clip body 12. In the engaged configuration, the barbs 32, 34, 36, 38 can bite into the component to securely hold the component.

Figure 14:
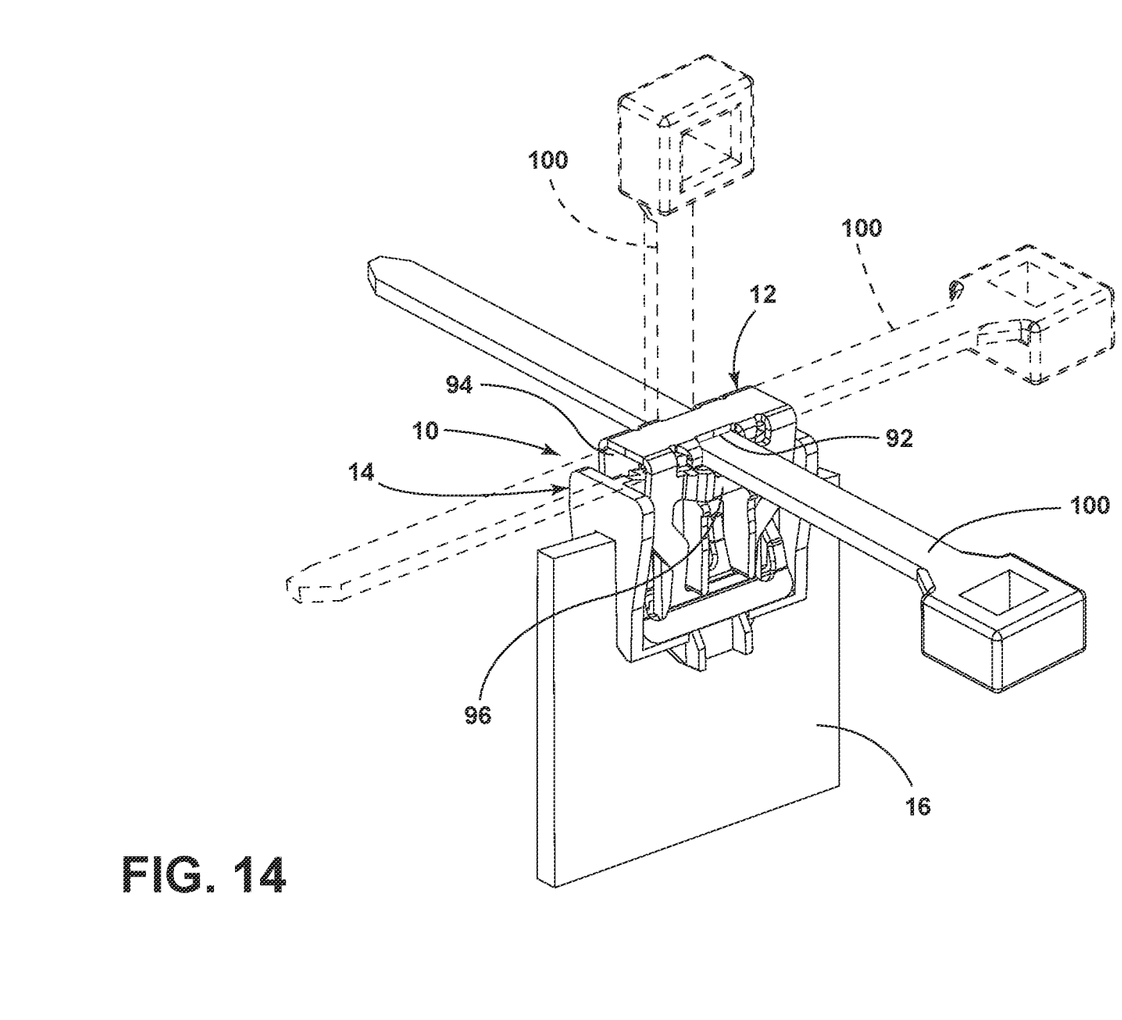
FIG. 14 is a perspective view of the edge clip assembly showing various orientations in which a cable tie can be held by the edge clip assembly.

Referring to FIG. 14, a cable tie 100 can be coupled with the edge clip assembly 10 and can be used to secure another component, not limited to a cable, to the component 16 held by the edge clip assembly 10. The edge clip assembly 10 can have at least one cable tie receiver 92, 94, 96 for holding the cable tie 100. Optionally, the cable tie 100 can be held by the edge clip assembly 10 in multiple orientations. Accordingly, the edge clip assembly 10 can be provided with multiple cable tie receivers for holding the cable tie 100 in one of the multiple orientations. Each cable tie receiver determines the orientation of the cable tie 100, and the cable tie 100 can be fed through the receiver such that the head and strap ends protrude from opposing sides of the receiver. The cable tie receivers can be configured to limit movement of the cable tie 100 relative to the edge clip assembly 10, for example to limit the rotation of the cable tie 100 within the receiver to +/−5 degrees relative to their intended orientation. FIG. 14 shows one cable tie 100 inserted in a first orientation and two other phantom-line cable ties 100 illustrating two alternative orientations.

In the illustrated embodiment, a first cable tie receiver 92 comprising aligned openings through each leg 18, 20 of the clip body 12, a second cable tie receiver 94 formed along the closed end 22 of the clip body 12 and extends laterally between the clip legs 18, 20, and a third and fourth cable tie receiver 96 comprising a U-shaped guide extending outwardly from each leg 18, 20. The edge clip assembly 10 can support a cable tie in multiple orientations in any one of the receivers 92, 94, 96, or support multiple cables ties at once in more than one receiver, thereby offering flexible application depending on the needs of the industry.

It is noted that throughout the figures, the component 16 is illustrated as a generic wall or vehicle panel. In other cases, the edge clip assembly 10 is useable to hold other components under tension to the clip, thus providing broad application across multiple industries. In automotive applications alone, the edge clip assembly 10 can be utilized in air bag assembly, window construction, instrument panels and interior and exterior trim attachment.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A self-locking edge clip assembly for attachment of a component, the edge clip assembly comprising:
    a clip body changeable between an open configuration in which a component may be freely inserted and an engaged configuration in which the component is captured thereby, the clip body comprising:
        a first clip leg, a second clip leg, and a clip end connecting the first and second clip legs, the first and second clip legs and the clip end together defining a clip interior having an open end;
        the first clip leg having a slot defined thereby; and
        the first and second clip legs being in spaced apart positions to define the open end of the clip interior when the clip body is in the open configuration;
    a spacer slideably and linearly moveable in the clip interior between an initial position in which the clip body is in the open configuration and a final position in which the clip body is in the engaged configuration, the spacer extending partially outside the clip body when in the initial position, the spacer comprising a rib extending along a surface thereof; and
    an interlock formed by an engagement of the rib with the slot, the interlock securing the spacer in the final position;
    a ramp disposed on the spacer and configured to confront the first clip leg in the final position, the ramp and the first clip leg defining a tool gap therebetween;
    whereby a tool can be wedged into the tool gap between the ramp and the first clip leg to pry the first clip leg outwardly and disengage the rib from the slot.

2. The edge clip assembly of claim 1, wherein the spacer and the ramp are integrally formed from a polymeric material.

3. The edge clip assembly of claim 2, wherein the clip body comprises one of a metal and a metal alloy.

4. The edge clip assembly of claim 1, wherein the spacer comprises:
    a first spacer leg;
    a second spacer leg; and
    a spacer end connecting the first and second spacer legs;
    wherein the first and second spacer legs are spaced apart and define an open end of the spacer for insertion of the component between the first and second spacer legs;
    wherein the ramp is disposed on one of the first spacer leg and the second spacer leg.

5. The edge clip assembly of claim 4, wherein the rib is disposed on the one of the first spacer leg and the second spacer leg, and is aligned with and spaced from the ramp.

6. The edge clip assembly of claim 4, wherein:
    the ramp comprises a first ramp disposed on the first spacer leg, and the tool gap comprises a first tool gap between the first ramp and the first clip leg;
    the spacer comprises a second ramp disposed on the second spacer leg, the second ramp configured to confront the second clip leg in the final position; and
    the second ramp and the second clip leg define second tool gap therebetween.

7. The edge clip assembly of claim 4, wherein the spacer comprises a plurality of ramps on at least one of the first spacer leg and the second spacer leg.

8. The edge clip assembly of claim 7, wherein the spacer comprises a plurality of ramps on each of the first spacer leg and the second spacer leg, wherein the plurality of ramps on the first spacer leg extend in a first direction and the plurality of ramps on the second spacer leg extend in a second direction opposite the first direction.

9. The edge clip assembly of claim 8, wherein:
    the spacer comprises a first projecting portion extending from a center portion of the first spacer leg, the plurality of ramps on the first spacer leg at least partially disposed on the first projecting portion; and
    the spacer comprises a second projecting portion extending from a center portion of the second spacer leg, the plurality of ramps on the second spacer leg at least partially disposed on the second projecting portion.

10. The edge clip assembly of claim 4, wherein the ramp slopes downwardly in a direction extending from the open end of the spacer toward the spacer end.

11. The edge clip assembly of claim 4, wherein:
    the spacer comprises a window disposed between the ramp and the spacer end; and
    the clip body comprises a barb, the barb being in register with the window in the final position in which the clip body is in the engaged configuration.

12. The edge clip assembly of claim 1, wherein the ramp extends from an outwardly-facing surface of the spacer toward an inwardly-facing surface of the first clip leg, wherein the first clip leg comprises an out-turned end that confronts the ramp to define the tool gap in the final position.

13. The edge clip assembly of claim 1, wherein the rib comprises a locking element engaging an edge of the slot to limit slideable withdrawal of the spacer from the clip body.

14. The edge clip assembly of claim 13, wherein the rib comprises a notch spaced from the locking element in a direction of slideable and linear movement of the spacer.

15. The edge clip assembly of claim 1, wherein:
    the slot is elongated and comprises a first end disposed toward the open end of the clip interior and a second end disposed toward the clip end, and
    the rib is elongated and comprises a first rib end and a second rib end spaced from the first rib end along a direction of slideable and linear movement of the spacer.

16. The edge clip assembly of claim 15, wherein the ramp slopes downwardly to a lower end, and the lower end of the ramp is spaced from the first end of the rib.

17. The edge clip assembly of claim 1, wherein:
    the slot is a first slot defined by the first clip leg;
    the rib is a first rib;

the interlock is a first interlock formed between the first slot and the first rib;

the second clip leg defines a second slot; and the spacer comprises a second rib forming a second interlock with the second slot.

18. The edge clip assembly of claim 1, wherein the slot is elongated and the interlock constrains the spacer to linear movement within the clip body in a direction of elongation.

19. The edge clip assembly of claim 1, wherein:

the rib is configured to exert a force pushing the first clip leg away from the second clip leg when the spacer is in the initial position and wherein the rib is configured to not exert a force pushing the first clip leg away from the second clip leg when the spacer is in the final position; and the ramp is configured to not exert a force on the first clip leg when the spacer is in the final position.

20. A self-locking edge clip assembly for attachment of a component, the edge clip assembly comprising:

a u-shaped clip body comprising a first clip leg, a second clip leg, a clip end wall connecting the first and second clip legs, and a slot in the first clip leg;

a u-shaped spacer slideably moveable in the clip body between an initial position in and a final position, the spacer comprising a first spacer leg, a second spacer leg, a spacer end wall connecting the first and second spacer legs, and a rib extending from the first spacer leg, the first and second spacer legs extending partially outside the clip body when in the initial position and being disposed entirely within the clip body when in the final position;

an interlock formed between the rib and the slot, the interlock securing the spacer in the final position; and a ramp disposed on the first spacer leg, and configured to confront the first clip leg in the final position, the ramp and the first clip leg defining a tool gap therebetween;

whereby a tool can be wedged into the tool gap between the ramp and the first clip leg to pry the first clip leg outwardly and disengage the rib from the slot.

\* \* \* \* \*